Feb. 14, 1950    C. JONES    2,497,409
ROTARY REEL RAKE
Filed Dec. 12, 1945    2 Sheets-Sheet 2
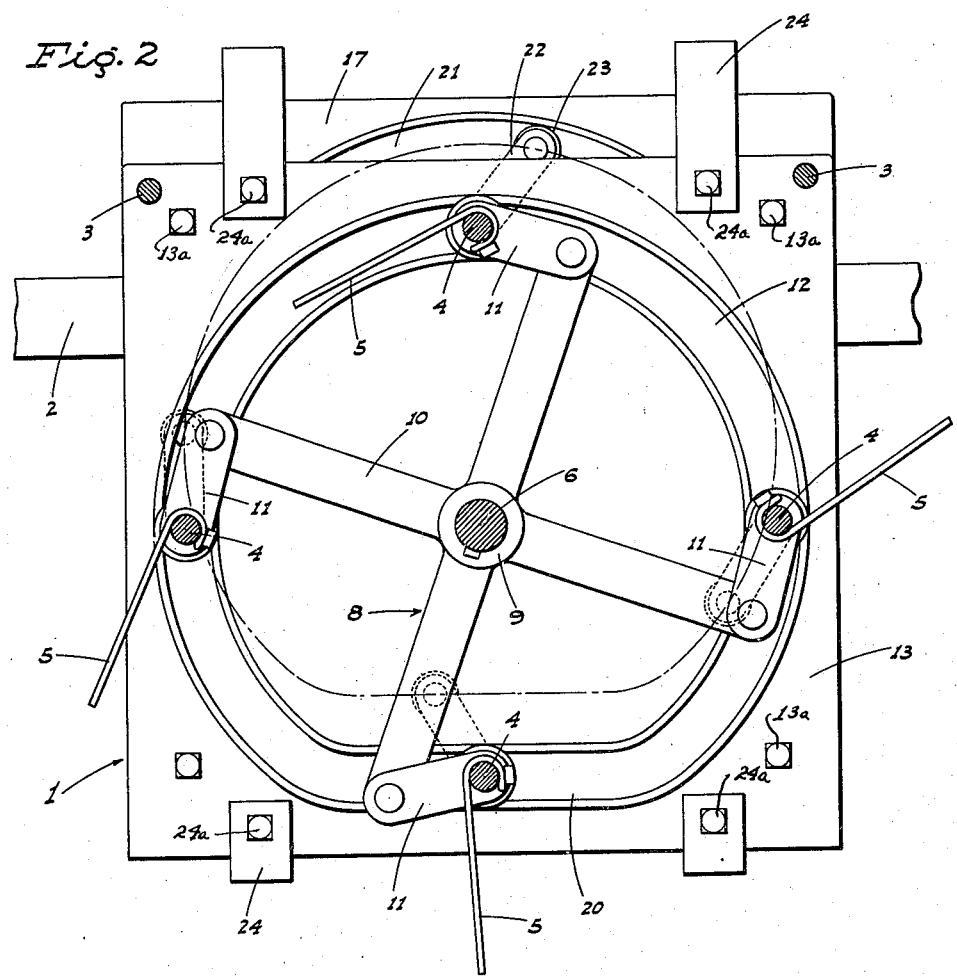
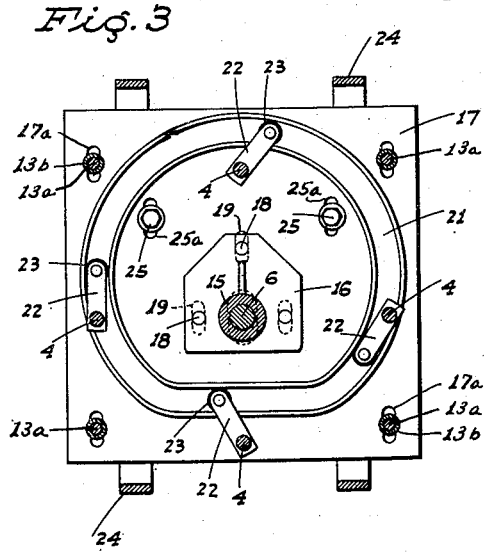
INVENTOR.
Chas. Jones
BY
Webster & Webster
ATTYS Patented Feb. 14, 1950

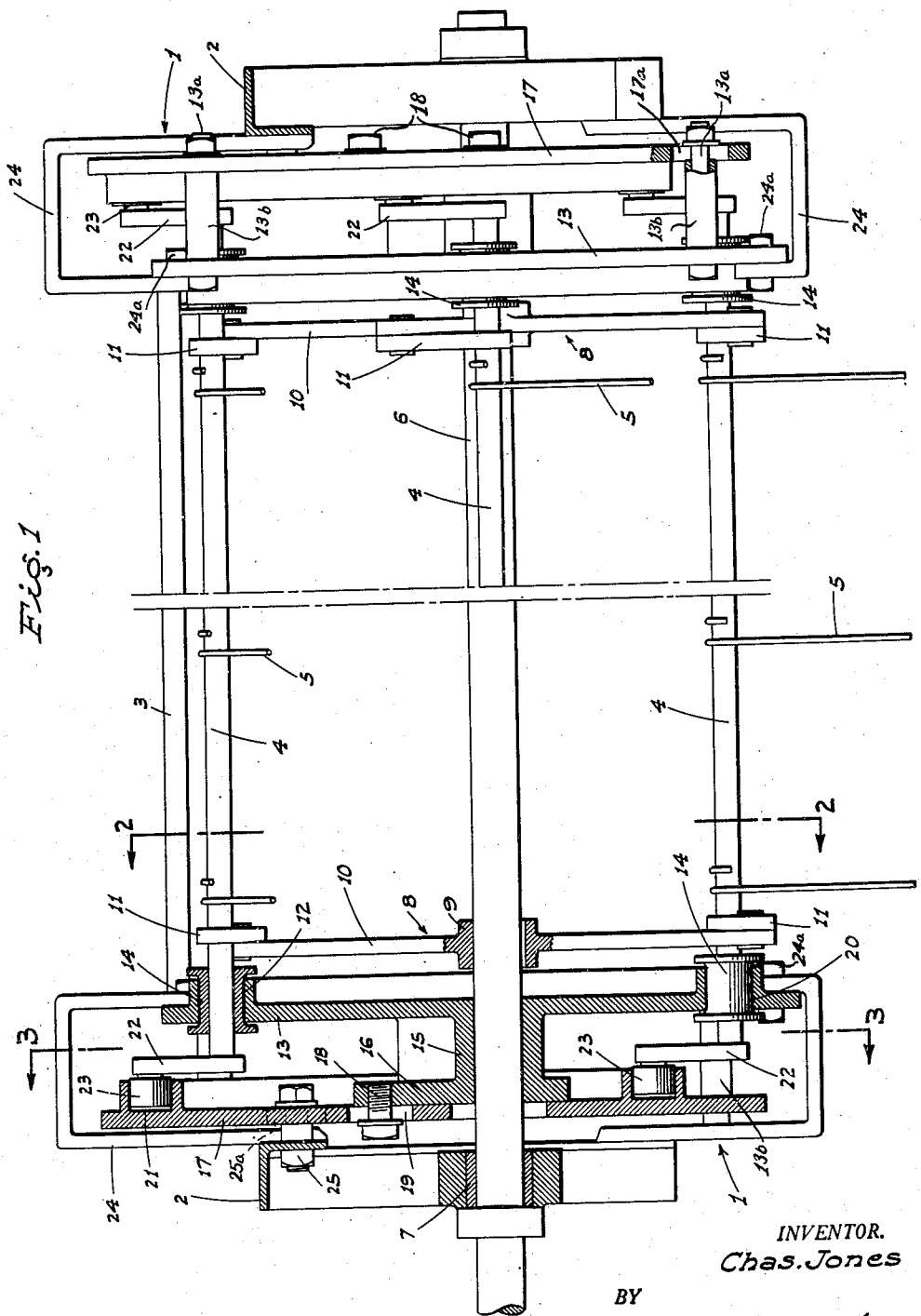

2,497,409

UNITED STATES PATENT OFFICE 2,497,409

ROTARY REEL RAKE

Charles Jones, Fresno, Calif.

Application December 12, 1945, Serial No. 634,423

8 Claims. (Cl. 56—364)

This invention relates to, and it is an object to provide, an improved rotary hay rake or reel; such reel being operative to rake hay in an effective and practical manner, and to work alfalfa hay or the like without knocking an undue amount of leaves off the same. The reel operates smoothly and with the tines traveling in such a path that a maximum recovery of hay is accomplished.

Another object of this invention is to provide a reel which is so constructed that the tines traverse a horizontal path at the bottom of said reel, whereby a sweeping action is obtained without any tendency to lift the hay, which is a desirable feature.

A further object of the invention is to provide a reel for hay raking, as in the preceding paragraph, in which the reel includes a plurality of circumferentially spaced tine shafts supported at the ends and actuated by a cam assembly of novel construction.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is an elevation, foreshortened, of the improved reel; one of the cam assemblies being shown in section.

Figure 2 is a cross section on line 2—2 of Fig. 1.

Figure 3 is a cross section, on reduced scale, on line 3—3 of Fig. 1.

Referring now more particularly to the characters of reference on the drawings, the reel comprises, at each end thereof, a cam assembly, indicated generally at 1, each of which cam assemblies is fixed, in the manner hereinafter described, in connection with the adjacent end frame 2 of the hay rake, which may be of side delivery type. The cam assemblies 1 are connected together at the top by spaced, longitudinally extending tie rods 3.

Below the tie rods 3 the reel includes a plurality of circumferentially spaced, longitudinally extending tine shafts 4, each of which is fitted with a row of spaced parallel tines 5 which are fixed in a conventional manner, and project downwardly when at the bottom of the reel; the tine shafts being supported and controlled by the cam assemblies 1 as follows:

A driven center shaft 6 is journaled at its ends, as at 7, in connection with the end frames 2 and extends centrally through the reel. Adjacent each cam assembly 1 the driven center shaft 6 is fitted with a spider 8 having a hub 9 fixed on said shaft; each spider 8 including arms 10 corresponding in number to the tine shafts 4.

The spider arms 10 project outwardly to a termination adjacent but somewhat spaced from the corresponding tine shafts 4 circumferentially of the reel, and said spider arms 10 are connected, at their outer ends, to said corresponding tine shafts 4 by means of pivotally connected links 11, through which links the tine shafts 4 turnably extend.

Laterally outwardly of the spiders 8 the tine shafts 4 project through an endless cam slot 12 formed in an adjacent cam plate 13 which is hereinafter identified as the inner cam plate. Spools 14 on the tine shafts 4 run in the cam slot 12 in guiding and supporting relation to said shafts.

The inner cam plate 13 is formed with a hub 15 about and supported by the center shaft 6, and laterally outwardly of said inner cam plate 13 the hub 15 is formed with a radial flange 16. Another cam plate 17, hereinafter identified as the outer cam plate, is secured to the radial flange 16, for up and down adjustment, by adjustment bolts 18 which engage through slots 19 in said outer cam plate 17.

The cam slot 12 of the inner cam plate 13 is circular, except at the bottom where it is provided with a horizontal section 20. The outer cam plate 17 is formed with an endless cam track 21 which is symmetrical to the cam slot 12 but is disposed in vertically offset relation thereto, as shown; the offset being capable of adjustment through the medium of the vertically adjustable outer cam plate 17.

The tine shafts 4 terminate between the inner and outer cam plates 13 and 17, respectively, and are there fitted with cranks 22 which include, on the outer end thereof, rollers 23 which run in the cam track 21 of said outer cam plate 17.

The inner cam plate 13 is supported from the end frame 2 by means of arch or bridge brackets 24 rigid with such end frame, the cam plate being secured to the inner ends of such members 24 by suitable fastening means such as bolts 24a. The outer cam plate 17 is connected with the end frame 2 by bolts 25 which project through the end frame 2 and elongated slots 25a in the outer cam plate 17. The outer cam plate 17 is also held rigidly connected to the inner cam plate 13 by means of bolts 13a mounted in the cam plate 13 and projecting through elongated slots 17a in the cam plate 17, there being spacer sleeves 13b disposed about the bolts 13a between the cam plates 13 and 17. The elongated slots 19, 17a and 25a in the cam plate 17 permit of vertical adjustment of the plate 17 relative to the plate 13.

When the above described reel is mounted in connection with a hay rake, and the same is in use, the center shaft 6 is driven, causing rotation of the reel. With rotation of the reel, the tine shafts 4 are moved through a circumferential path corresponding to the configuration of the cam slot 12, which includes the horizontal section 20. As a consequence, the tines 5 traverse a horizontal path at the bottom of the reel, whereby the reel produces a sweeping action rather than a lifting action on the hay. This is an advantageous feature.

The outer cam plate 17 is adjusted so that the offset of the cam track 21 is such that with movement of the tine shafts 4 about the cam slot 12, the cranks 22, which engage in and are controlled by the cam track 21, cause the tines 5 to assume a substantially downwardly projecting position when the corresponding tine shafts 4 are traversing the horizontal section 20.

Above said horizontal section 20, and while traversing the remainder of the cam slot 12, the tine shafts 4 are rotated by the cranks 22 so that the tines swing through a full circle so as to again be in a dependent position for the next pass along the bottom of the reel.

The above described reel provides a structure for the raking of hay in a smooth, effective, and practical manner, and in addition the structure is simple, requiring a minimum of maintenance or repair.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A reel comprising a driven center shaft, a plurality of longitudinal, circumferentially spaced tine shafts surrounding the center shaft, rows of tines on said tine shafts, spiders on the center shaft adjacent the ends of the reel, means connecting the spiders to the tine shafts, the latter being rotatable, and a cam assembly supporting the tine shafts at the ends and including a cam plate through which the center shaft projects, said cam plate having an endless cam slot surrounding the center shaft, the tine shafts projecting through the cam slot and being guided thereby for movement in a circumferential path corresponding to the configuration of the cam slot, said cam slot having a substantially horizontal straight portion at the bottom, and means cooperating with the tine shafts outwardly of the cam plate operative to rotatively position the tine shafts so that the rows of tines depend substantially vertically therefrom as the tine shafts traverse the straight bottom portion of the cam slot.

2. A reel comprising a driven center shaft, a plurality of longitudinal, circumferentially spaced tine shafts surrounding the center shaft, rows of tines on said tine shafts, spiders on the center shaft adjacent the ends of the reel, means connecting the spiders to the tine shafts, the latter being rotatable, and a cam assembly supporting the tine shafts at the ends and including a cam plate through which the center shaft projects, said cam plate having an endless cam slot surrounding the center shaft, the tine shafts projecting through the cam slot and being guided thereby for movement in a circumferential path corresponding to the configuration of the cam slot, another cam plate mounted outwardly of said first named cam plate but in adjacent facing relation thereto, an endless cam track on said other cam plate symmetrical to but offset relative to the endless cam slot in said first named cam plate, and cranks on the tine shafts between the cam plates cooperating with and riding in guided relation on said endless cam track.

3. A reel comprising a driven center shaft, a plurality of longitudinal, circumferentially spaced tine shafts surrounding the center shaft, rows of tines on said tine shafts, spiders on the center shaft adjacent the ends of the reel, means connecting the spiders to the tine shafts, the latter being rotatable, and a cam assembly supporting the tine shafts at the ends and including a cam plate through which the center shaft projects, said cam plate having an endless cam slot surrounding the center shaft, the tine shafts projecting through the cam slot and being guided thereby for movement in a circumferential path corresponding to the configuration of the cam slot, another cam plate mounted outwardly of said first named cam plate but in adjacent facing relation thereto, an endless cam track on said other cam plate symmetrical to but offset relative to the endless cam slot in said first named cam plate, and cranks on the tine shafts between the cam plates cooperating with and riding in guided relation on said endless cam track; said endless cam slot and endless cam having corresponding straight portions at the bottom, and said other cam plate being relatively vertically adjustable.

4. A reel comprising a driven center shaft, a plurality of longitudinal, circumferentially spaced tine shafts surrounding the center shaft, rows of tines on said tine shafts, spiders on the center shaft adjacent the ends of the reel, means connecting the spiders to the tine shafts, the latter being rotatable, and a cam assembly supporting the tine shafts at the ends and including a cam plate through which the center shaft projects, said cam plate having an endless cam slot surrounding the center shaft, the tine shafts projecting through the cam slot and being guided thereby for movement in a circumferential path corresponding to the configuration of the cam slot, another cam plate mounted outwardly of said first named cam plate but in adjacent facing relation thereto, an endless cam track on said other cam plate symmetrical to but offset relative to the endless cam slot in said first named cam plate, and cranks on the tine shafts between the cam plates cooperating with and riding in guided relation on said endless cam track; the tine shafts being provided with spools which ride in the endless cam slot, and the cranks being provided with rollers which ride on the endless cam track.

5. A reel as in claim 4 in which the endless cam track is in the form of a channel track.

6. A reel as in claim 3 in which the first named cam plate includes a hub on the center shaft, said hub having a radial flange and the other cam plate being vertically adjustably secured to said flange.

7. A hay rake comprising a supporting frame, a driven shaft journaled in the frame, spaced apart pairs of parallel spider arms fixed to the shaft and projecting radially therefrom, a link pivoted on the outer end of each spider arm, a tine shaft turnably mounted in each pair of links, tines fixed on each tine shaft, a cam plate fixed relative to the driven shaft and provided with a cam slot disposed circumferentially about the driven shaft, each tine shaft projecting into the cam slot and guided therein, the cam slot at its lower side having a horizontal section, the balance of the slot being circular, and cam operated means separate from the first named cam plate and operatively connected with the tine shafts to turn the same to position the tines thereon in a substantially vertical position as the tine shafts travel the horizontal run of said cam slot.

8. A hay rake as in claim 7 in which said last named cam operated means includes a second cam plate fixed relative to the driven shaft and spaced from the first cam plate in facing relation thereto, the second cam plate being provided with a cam slot of the same contour as the first named cam slot but offset vertically with respect thereto, a crank arm fixed on each tine shaft, and a roller on each crank arm projecting into the second named cam slot.

CHARLES JONES.

REFERENCES CITED

The following references are of record in the file of this patent:

UNITED STATES PATENTS

| Number | Name | Date |
| --- | --- | --- |
| 255,298 | Kanne | Mar. 21, 1882 |
| 2,102,709 | Hume et al. | Dec. 21, 1937 |
| 2,144,905 | Wallace | Jan. 24, 1939 |